US011077610B2

(12) United States Patent
Blanchet et al.

(10) Patent No.: US 11,077,610 B2
(45) Date of Patent: Aug. 3, 2021

(54) METHOD FOR POWDER-BASED ADDITIVE MANUFACTURING OF A PART, IN PARTICULAR A LINING ELEMENT FOR A TIRE MOULD

(71) Applicant: COMPAGNIE GENERALE DES ETABLISSEMENTS MICHELIN, Clermont-Ferrand (FR)

(72) Inventors: Etienne Blanchet, Clermont-Ferrand (FR); Romain Calvel, Clermont-Ferrand (FR); Florian Eparvier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 538 days.

(21) Appl. No.: 15/773,465

(22) PCT Filed: Nov. 3, 2016

(86) PCT No.: PCT/EP2016/076582
§ 371 (c)(1),
(2) Date: May 3, 2018

(87) PCT Pub. No.: WO2017/076983
PCT Pub. Date: May 11, 2017

(65) Prior Publication Data
US 2018/0319077 A1 Nov. 8, 2018

(30) Foreign Application Priority Data
Nov. 6, 2015 (FR) ........................................ 1560655

(51) Int. Cl.
*B29C 64/153* (2017.01)
*B22F 5/00* (2006.01)
(Continued)

(52) U.S. Cl.
CPC ............ *B29C 64/153* (2017.08); *B22F 5/003* (2013.01); *B22F 5/007* (2013.01); *B22F 10/20* (2021.01);
(Continued)

(58) Field of Classification Search
CPC ..................................................... B29C 64/153
See application file for complete search history.

(56) References Cited

U.S. PATENT DOCUMENTS

2004/0031780 A1 2/2004 Hagemeister et al.
2013/0244040 A1 9/2013 Oshima
2015/0258609 A1 9/2015 Teulet

FOREIGN PATENT DOCUMENTS

WO   WO 2012/131481   10/2012
WO   WO 2014/060209    4/2014
(Continued)

*Primary Examiner* — Larry W Thrower
(74) *Attorney, Agent, or Firm* — Cozen O'Connor

(57) ABSTRACT

Method for additive manufacturing of at least one component comprises the manufacture, by depositing and selective melting of layers of powder, of at least one intermediate assembly comprising the component produced at an inclined angle and forming an angle of between 20° and 70° with a manufacturing support plate, a support interposed between the support plate and a lower base of the component, and at least one local supporting element resting against the rear frontal face of the component. During the selective-melting phases of the manufacturing step, incipient cracks are formed in regions of connection of the support and of the supporting element to the component. The component is separated from the support and the local supporting element after the manufacturing step by breaking of the connecting regions.

9 Claims, 3 Drawing Sheets

(51) Int. Cl.
    *B33Y 80/00*     (2015.01)
    *B22F 10/20*     (2021.01)
    *B33Y 10/00*     (2015.01)
    *B29C 64/245*     (2017.01)
    *B29D 30/06*     (2006.01)
    *B28B 1/00*     (2006.01)
    *B29L 31/00*     (2006.01)

(52) U.S. Cl.
    CPC ........ *B29C 64/245* (2017.08); *B29D 30/0606* (2013.01); *B33Y 10/00* (2014.12); *B33Y 80/00* (2014.12); *B22F 2998/10* (2013.01); *B28B 1/001* (2013.01); *B29D 2030/0616* (2013.01); *B29L 2031/757* (2013.01); *Y02P 10/25* (2015.11)

(56) References Cited

FOREIGN PATENT DOCUMENTS

| | | |
|---|---|---|
| WO | WO 2014/124969 | 8/2014 |
| WO | WO 2014/124971 | 8/2014 |
| WO | WO 2014/207454 | 12/2014 |
| WO | WO 2015/019070 | 2/2015 |

METHOD FOR POWDER-BASED ADDITIVE MANUFACTURING OF A PART, IN PARTICULAR A LINING ELEMENT FOR A TIRE MOULD

RELATED APPLICATIONS

This is a U.S. National Phase Application under 35 USC 371 of International Application PCT/EP2016/076582 filed on Nov. 3, 2016.

This application claims the priority of French application no. 1560655 filed Nov. 6, 2015, the entire content of which is hereby incorporated by reference.

FIELD OF THE INVENTION

The present invention relates to a method for the powder-based additive manufacture of a component, and particularly of a lining element. The moulding element is intended to be used in a vehicle tire curing or vulcanizing mould, notably in a mould of the segmented type.

BACKGROUND OF THE INVENTION

A segmented mould mainly comprises two lateral shells that each mould one of the lateral sidewalls of the tire, and a plurality of segments or sectors that mould the tread of the said tire and are radially movable between a mould-open position and a mould-closed position. The shells and the sectors define an inner space that is intended to be brought into contact with the unvulcanized green form of the tire.

In order to mould the tread of the tire, the mould sectors comprise lining elements. What is meant by a "lining element" is a part of the mould which comprises a moulding surface that allows at least part of the tread surface of this tread to be moulded.

It is possible to produce a lining element through a method of powder-based additive manufacturing by sintering or by melting grains of the said powder using a beam of energy. A "beam of energy" or "energy beam" is understood to mean electromagnetic radiation (for example a laser beam) or a beam of particles (for example an electron beam).

The advantage of manufacturing by selective melting of superposed layers of powder, more commonly referred to as sintering, mainly lies in the fact that the shape of these lining elements may be modelled by a computer and that the lining elements may then be manufactured on the basis of this modelling by computer control of the beam of energy. When the selective melting is carried out by a laser beam, it is referred to as laser sintering. The laser sintering technique consists in manufacturing the component layer by layer, by stacking the layers of powder, which are consolidated and fused on top of one another by the laser beam, in a stacking direction.

Patent application FR-A1-3 002 167 (Michelin) describes a particular lining element obtained by using this laser sintering technique. The lining element consists of a body delimiting a front surface intended to mould part of the tread surface of the tire, and of bars and sipe blades extending out from this moulding surface to form the tread patterns of the tread of the tire.

Conventionally, the manufacture of such a lining element is performed horizontally on a dedicated manufacturing support plate so as to avoid having too great a height and so as thus to reduce the manufacturing time. In order to support the lining element while it is being manufactured, support elements are formed between a rear surface of the body of this lining element and the manufacturing support plate. After manufacture, the lining element is detached from the support elements.

With such a horizontal type of manufacture it is necessary to foresee operations of machining the rear surface of the lining element which surface is intended to come into contact with part of the tire curing mould, this being so as to eliminate traces of the support elements and to guarantee the desired geometric dimensions. Moreover, with this type of manufacture, the number of lining elements that can be manufactured on the one same manufacturing support plate is limited.

It will therefore be appreciated that there is a need to offer a solution that makes it possible to limit, or even to eliminate, the operations of machining the components after manufacture by laser sintering, and to increase the number of components that can be manufactured on the one same manufacturing support plate.

SUMMARY OF THE INVENTION

One aspect of the invention relates to a method for additive manufacturing of a plurality of components on a manufacturing support plate by powder sintering or melting using at least one beam of energy, each component comprising at least two opposite front and rear frontal faces delimiting the thickness of the said component and protrusions projecting out from the front frontal face thereof, the method comprising the following steps:

a) simultaneous manufacturing, by depositing and selective melting of layers of powder stacked on the manufacturing support plate, of a plurality of intermediate assemblies at least in one row, each intermediate assembly comprising:

a component produced at an inclined angle with respect to the manufacturing support plate and forming an angle of between 20° and 70° with the said support plate, a support interposed between the manufacturing support plate and a lower base of the said component, at least one local supporting element resting against the rear frontal face of the component, the said local supporting element of the said assembly being arranged and configured in such a way as to avoid any contact with the protrusions of the component of the adjacent intermediate assembly of the row, and the fused powder layers of the component, of the support and of the said local supporting element being joined to one another during this manufacturing step, b) formation, during the selective-melting phases of the manufacturing step, of incipient cracks in regions of connection of the support and of the said supporting element to the said component of each intermediate assembly, c) separation of the component from the support and the said local supporting element of each intermediate assembly after the manufacturing step by breaking of the said connecting regions.

The term "powder" is to be understood to mean a powder or a mixture of powders. The powder may for example be metallic, plastic or mineral, for example ceramic.

Creating the component at an inclined angle with respect to the manufacturing support plate means that a higher number of components can be manufactured on the one same manufacturing support plate by comparison with manufacture of the horizontal type. Thus, a plurality of intermediate assemblies can be manufactured simultaneously on the common manufacturing support plate, at least in one row. Furthermore, there is lower use of consumables (support plate, powder) for creating the components. These components are therefore more economical to manufacture.

Furthermore, with the component inclined at an angle greater than or equal to 20° and less than or equal to 70°, and preferably of between 30° and 60°, it is easier to obtain a component that conforms to the required surface-finish features. With too small an angle of inclination, for example less than 20°, when the component is being manufactured the layer of powder in the process of being melted rests excessively on unmelted regions of the previous layer of powder, thereby generating unevenness and therefore a higher level of roughness.

Furthermore, thanks to this intended angle of inclination, partial, rather than full, support is enough to ensure that the component is held in place adequately during manufacture. With a limited number of local supporting elements, the risk of the component vibration and deformation, notably in bending, during the steps of melting of the successive layers and also during the passage of the layering device that prepares the bed of powder on each of the layers of powder melted beforehand is reduced.

The provision of a support connected on one side to the manufacturing support plate and on the other to the lower base of the component also contributes to the correct holding-in-place of the component during manufacture.

Moreover, after manufacture, this intermediate support makes it easier to detach the component from the manufacturing support plate. The separating of the component from the support but also from the said local supporting element, is also made easier by the incipient cracks created and which make it possible locally to reduce the mechanical resistance of the said local supporting element and of the support.

These incipient cracks also make it possible to limit the traces left on the component after breakage and thus to avoid the need to provide subsequent machining operations. For example, when the component is a lining element for a tire mould, this component can be mounted directly in the mould after the operation of detaching it. The method of obtaining the components is thus easier, because there are fewer pre- and post-manufacturing operations (programming, machine loading/unloading cycle, cutting, machining).

The incipient cracks may for example comprise a local reduction in the thickness of the said connecting zones and/or local cavities formed on the said zones.

When the component is a lining element for a tire mould, these protrusions are intended to mould cuts in the tread of the tire. "Cuts" in the tread means the space delimited by walls of material extending from the tread surface, facing one another, and distant from one another by a non-zero distance. The protrusions may for example be bars and/or sipe blades intended respectively to form grooves and/or sipes in the tread of the tire.

In one advantageous embodiment, at least one groove is formed locally on the rear frontal face of the component of each intermediate assembly during the manufacturing step, the region of connection of the said local supporting element to the said component being positioned inside the said groove. Thus, any possible traces left behind on the component by the detaching of this supporting element are set back from the functional rear frontal face of the component.

In one particular embodiment, a chamfered part is formed between the lower base of the component of each intermediate assembly and the rear frontal face thereof, the region of connection of the support to the said component being connected to the chamfered part. Thus, any possible traces left behind on the component by the detaching of the support have no impact on its subsequent mounting with other elements.

In one embodiment, the region of connection of the support of each intermediate assembly to the said component and/or the region of connection of the said supporting element to the said component have a density of less than 98%. That makes it possible to obtain connecting regions in which the powder has been melted using downgraded parameters, resulting in a local reduction in the mechanical properties making breakage easier and shortening the manufacturing time. The incipient cracks are obtained by a reduced density.

As indicated earlier, the support for the component is partial rather than full support. By way of indication, it is possible to provide at least two local supporting elements each one resting against one of the ends of the rear frontal face of the component of each intermediate assembly.

In one embodiment, the said local supporting element of each intermediate assembly extends from the manufacturing support plate. Alternatively or in combination, the said local supporting element of each intermediate assembly is connected to the rear frontal face of the component of the said assembly and to the front frontal face of the component of the adjacent intermediate assembly of the row, these said faces facing one another. In another alternative form, the said local supporting element of each intermediate assembly is connected to the rear frontal face of the component of the said assembly and to the rear frontal face of the component of the adjacent intermediate assembly of the row, these said faces facing one another.

The component of each intermediate assembly may be a lining element for a tire mould and may have a thickness of between 0.25 and 6 millimetres.

Another aspect of the invention relates to an intermediate assembly obtained by implementation of the process as defined above.

BRIEF DESCRIPTION OF THE DRAWINGS

The present invention will be understood better from reading the detailed description of embodiments which are given by way of entirely non-limiting example and are illustrated by the appended drawings, in which.

DETAILED DESCRIPTION OF THE DRAWINGS

Figure 1:
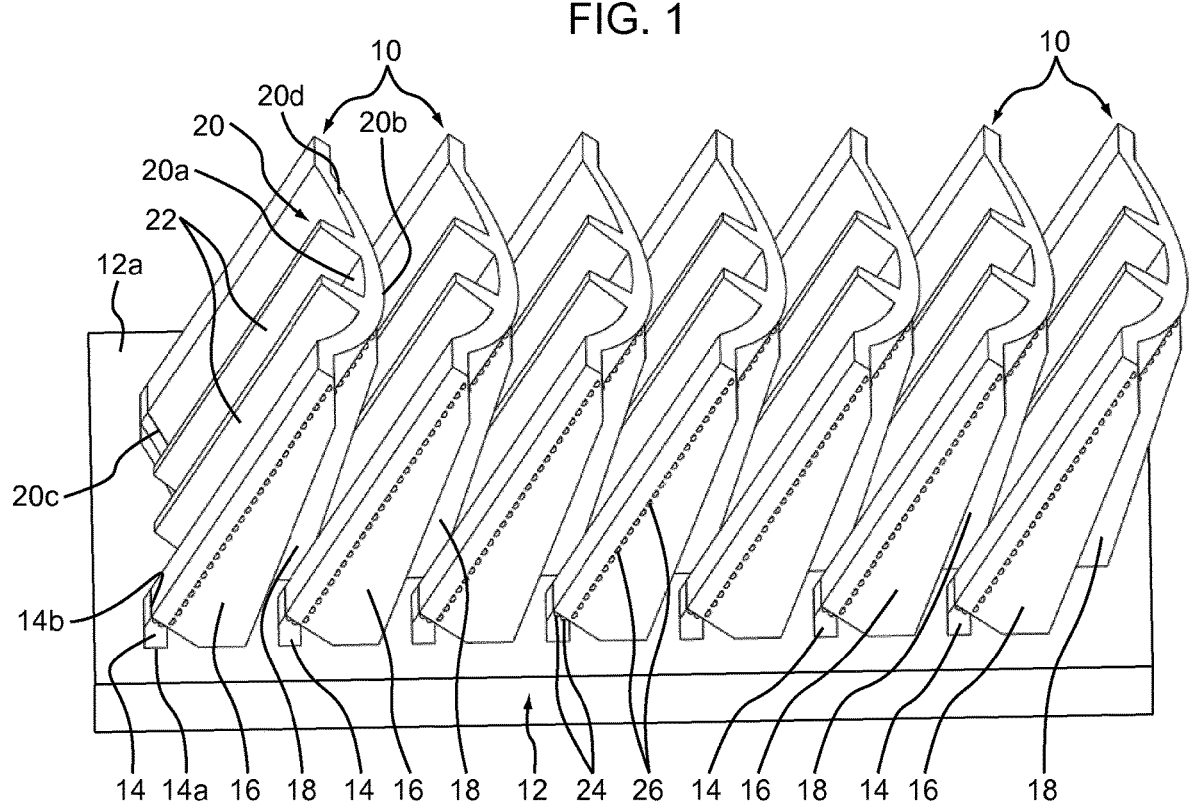
FIG. 1 is a schematic perspective view partially illustrating a method for manufacturing lining elements according to a first exemplary embodiment.

FIG. 1 depicts an arrangement of identical lining elements 10 which are intended to be used in a tire curing or vulcanizing mould and are formed on a manufacturing support plate 12 depicted in a position assumed to be horizontal.

Each lining element 10 is associated with a support 14 interposed between the said element and the manufacturing support plate 12, and with local supporting elements 16, 18. The support 14 is a component distinct from the local supporting elements 16, 18.

As will be described in greater detail later on, the lining elements 10, the supports 14 and the supporting elements 16, 18 are manufactured by the deposition and selective melting of layers of powder stacked on a work surface 12a of the manufacturing support plate. The lining elements 10, the supports 14 and the supporting elements 16, 18 are respectively identical to one another.

Each lining element 10 comprises a body 20 which is delimited by a front frontal face 20a and by an opposite, rear frontal face 20b. The body 20 also comprises a lower base 20c and an upper end surface 20d connecting the said faces. The frontal faces 20a, 20b delimit the thickness of the body 20. The front frontal face 20a forms a moulding surface intended to mould all or part of the tread surface of the tire. The rear frontal face 20b is intended to be in contact with another part of the curing mould to which the lining element 10 is attached. The frontal face 20b forms a surface for anchoring the lining element 10 to the said other part of the curing mould. In the case of a mould of the segmented type, the lining element 10 is fixed to one of the mould sectors.

In the exemplary embodiment illustrated, each lining element 10 also comprises a plurality of protrusions 22 projecting out from the frontal face 20a of the lower base 20c at the upper end surface 20d. The protrusions 22 are formed in one part with the body 20. The protrusions 22 constitute bars intended to mould grooves in the tread of the tire. Each lining element 10 may also comprise other types of protrusions forming sipe blades and intended to mould sipes in the tread of the tire.

Each lining element 10 is manufactured at an inclined angle with respect to the manufacturing support plate 12. The rear frontal face 20b forms with the manufacturing support plate 12 an angle α (FIG. 2) of between 20° and 70° and preferably of between 30° and 60°. In the exemplary embodiment illustrated, the width of the lining element 10 extends in a direction that forms with the support plate 12 the angle α. As an alternative, it is possible to foresee a different orientation for each lining element 10 so that its length extends in a direction that forms with the support plate 12 an angle of between 20° and 70° and preferably of between 30° and 60°. However, with such an orientation, the height of the lining element 10 is increased.

The support 14 is interposed between the associated lining element 10 and the manufacturing support plate 12. The support 14 is connected on one side to the working surface 12a of the manufacturing support plate and on the other side to the lower base 20c of the lining element. The support 14 comprises a lower base 14a connected to the work surface of the manufacturing support plate 12 and an upper end surface 14b connected to the lower base 20c of the lining element. There is no direct contact between the manufacturing support plate 12 and the lower base 20c of each lining element. The lower base 20c of each lining element 10 rests completely on the support 14. The support 14 extends along the lower base 20c of the associated lining element. The support 14 extends along the entire length of the lower base 20c of the associated lining element.

Each supporting element 16, 18 associated with a lining element 10 extends from the working surface 12a of the manufacturing support plate and is connected to the rear frontal face 20b of the said element. Each supporting element 16, 18 extends only at the rear of the frontal face 20b of the associated lining element 10 against which it rests. Each supporting element 16, 18 here exhibits a height substantially equal to that of the associated lining element 10 so as to support the said element over its entire height. In the exemplary embodiment illustrated, one supporting element 16 is provided at each end of the frontal face 20b of the lining element (only one being visible in the figure), and two supporting elements 18 are arranged between the supporting elements 16.

FIG. 1 depicts one step in the method of manufacturing the lining elements 10. This method comprises a plurality of successive steps of depositing layers of powder and of agglomerating the powder by selective melting. The powder may for example be metallic, plastic or mineral, for example ceramic.

The method begins with a step of depositing a first layer of powder on the working surface 12 of the manufacturing support plate. After deposition, the first layer extends substantially horizontally over the working surface 12a. Next, an energy source (not depicted), for example of laser type, emits a beam of energy the orientation of which is controlled by galvanometric mirrors (not depicted). An optical lens (not depicted) makes it possible to focus the beam of energy in order to heat the layer of powder in a pattern corresponding to the cross section of the support 14 and of the supporting elements 16, 18 associated with the lining element 10 that is to be manufactured, and thus to selectively achieve melting of the powder.

These steps are repeated again in each region of the working surface 12a of the manufacturing support plate in order to form the lining element 10, the support 14 and the associated supporting elements 16, 18 by the stacking of fused layers.

Thus, during the method, a plurality of intermediate elements each one comprising the lining element 10, the support 14 and the associated supporting elements 16, 18 which are joined together during the steps of selective melting of the layers of powder are manufactured on the working support plate 12. During manufacture, the lining element 10, the support 14 and the supporting elements 16, 18 are produced in a single piece.

The supporting elements 16, 18 make it possible to keep in position the associated lining element 10 that is in the process of being manufactured. This thus limits the risk of deformations, in particular by bending during the passage of the layering device and by diffusion of heat during the melting steps, which may give rise to the appearance of stress concentration and microcrack phenomena. The support 14 also contributes to keeping the lining element 10 in position during manufacture.

Figure 2:
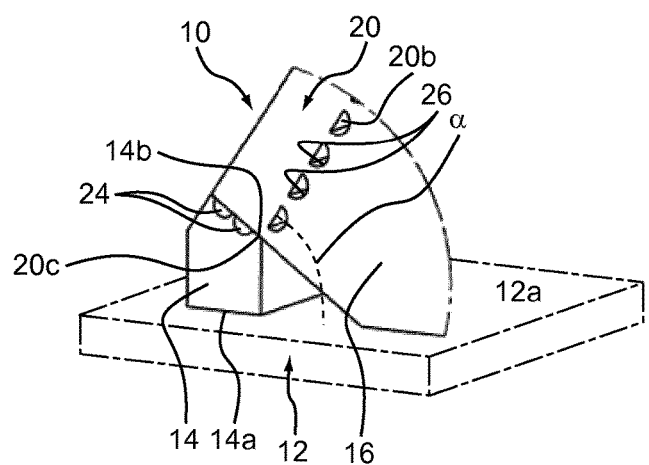
FIGS. 2 and 3 are views of details of FIG. 1, FIGS. 4A to 5B are schematic views partially illustrating separation steps of a method for manufacturing lining elements according to other exemplary embodiments.

As illustrated more visibly in FIG. 2, perforations or cavities 24 are formed in the region of connection of the support 14 to the associated lining element. This region of connection of the support 14 is formed by that part of the support that is adjacent to the lower base 20c of the lining element. In the exemplary embodiment illustrated, the cavities 24 open onto the upper end surface 14b of the support. Alternatively, it may be possible to provide cavities 24 that are not open-ended.

Cavities 26 are also formed in the region of connection of each supporting element 16, 18 to the associated lining element. This region of connection of the supporting element is formed by that part of the said element that is adjacent to the rear frontal face 20b of the lining element. The cavities 26 are also open-ended. As an alternative, it might be possible to provide cavities 24, 26 that are not open-ended.

The cavities 24, 26 are formed during the phases of selective melting of the layers of powder. These cavities 24, 26 form rupture initiators, i.e. incipient cracks, intended to facilitate the subsequent separation of the lining element 10 from the support 14 and the supporting elements 16, 18. In order to make this detachment even easier still, the cavities 24, 26 are preferably formed over the entire length of the associated connecting region.

Figure 3:
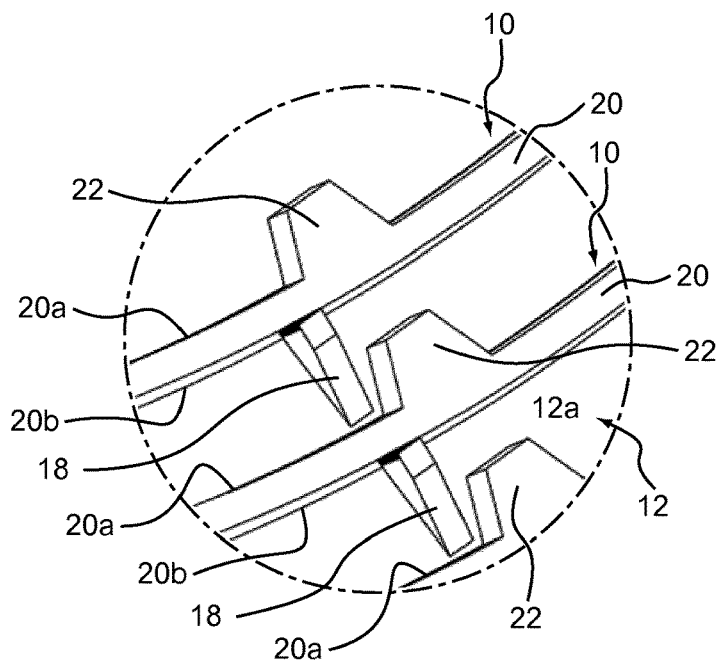

After manufacture, the intermediate elements, each formed of a lining element 10 and the support 14 and the associated supporting elements 16, 18, are arranged on the support plate 12 in a row. Producing the lining elements 10 at an inclined angle with respect to the manufacturing support plate 12 makes it possible to manufacture a significant number of them. Furthermore, as illustrated more visibly in FIG. 3, each local supporting element 16, 18 of a lining element 10 is arranged and configured in such a way as to avoid any contact with the protrusions 22 of the immediately adjacent lining element 10 of the row. This relative layout of the lining elements 10 makes it possible to reduce the separation provided between them and therefore further increase the number of elements that can be manufactured on the manufacturing support plate 12.

After manufacture, each intermediate element formed by the lining element 10 and the support 14 and the associated supporting elements 16, 18 is detached from the manufacturing support plate 12 for example by cutting using wire electron discharge machining. Each lining element 10 can then be detached from the support 14 and from the supporting elements 16, 18 by breaking the regions of connection of this support and of these supporting elements to the said element. This breakage may be obtained by pulling, potentially for example by hand, or once again by a cutting operation using wire electron discharge machining. The support 14 and the supporting elements 16, 18 associated with each lining element 10 are used only for the manufacture of the said element. As an alternative, it might be possible to detach the lining element 10 of each intermediate element from the support 14 and the associated supporting elements 16, 18 still fixed to the manufacturing support plate 12. After the lining elements 10 have been detached, the supports 14 and the supporting elements 16, 18 can be destroyed and the manufacturing support plate 12 resurfaced by machining so that it can be used again.

As indicated previously, the incipient cracks formed during the phases of selective melting of the layers of powder in the regions of connection of the support 14 and of the supporting elements 16, 18 to the lining element 10 are intended to facilitate separation thereof. These incipient cracks also make it possible to limit the traces left on the lining element 10 after this detachment and thus to avoid the need to provide subsequent machining operations on this element before it is mounted in the tire mould.

Figure 4A:
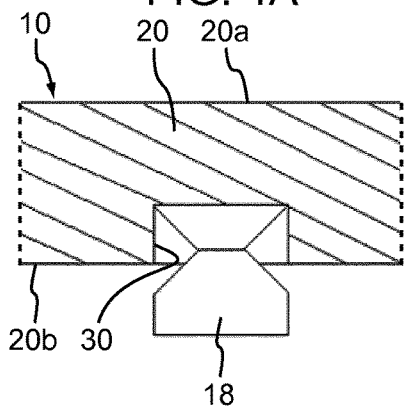
Figure 4B:
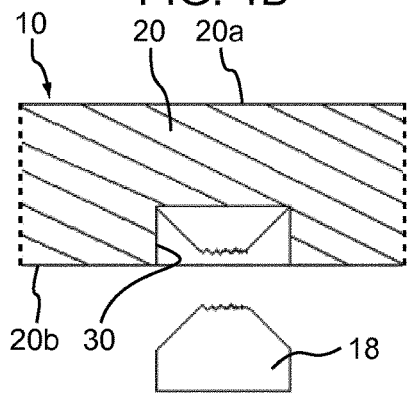

In order to eliminate these traces still further, it is possible in another exemplary embodiment illustrated in part in FIGS. 4A and 4B, in which the elements that are identical bear the same references, to form locally, on the rear frontal surface 20b of each lining element 10 a plurality of grooves 30 each devoted to the connecting of one of the associated supporting elements to the said lining element. The region of connection of each supporting element is positioned inside the associated groove 30, making it possible to avoid having traces on the rear frontal surface 20b of the lining element 10. Any such traces that may be left by the detachment of the supporting element are set back from the frontal surface 20b and situated inside the groove 30. The region of connection of the supporting element to the lining element here exhibits a shape that is chamfered in order locally to reduce the thickness of the said supporting element and the mechanical integrity thereof in order to make subsequent breakage easier. In this example, grooves are provided only on the rear frontal surface of each lining element. Alternatively or in combination, it might also be possible to provide such a groove on the lower base of each lining element 10.

Figure 5A:
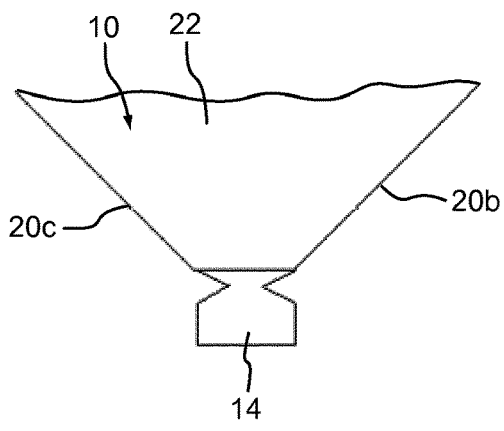
Figure 5B:
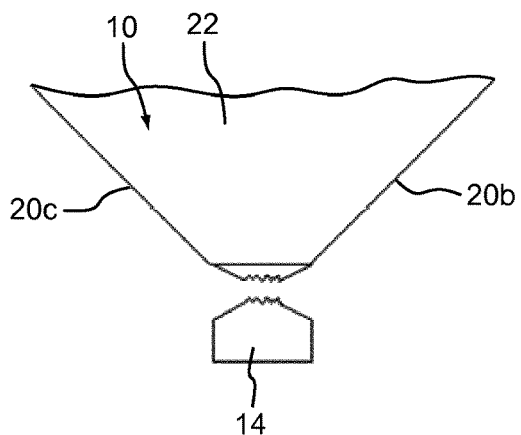

In another alternative form of embodiment illustrated in FIGS. 5A and 5B, in which the elements that are identical bear the same references, a chamfered part is formed between the lower base 20c of the lining element and the rear frontal face 20b thereof. This chamfered part is connected to the support 14. The region of connection of the support 14 to the lower base 20c of the lining element is connected to this chamfered part of the lining element. In this example, this connecting region likewise has a chamfered shape.

Figure 6:
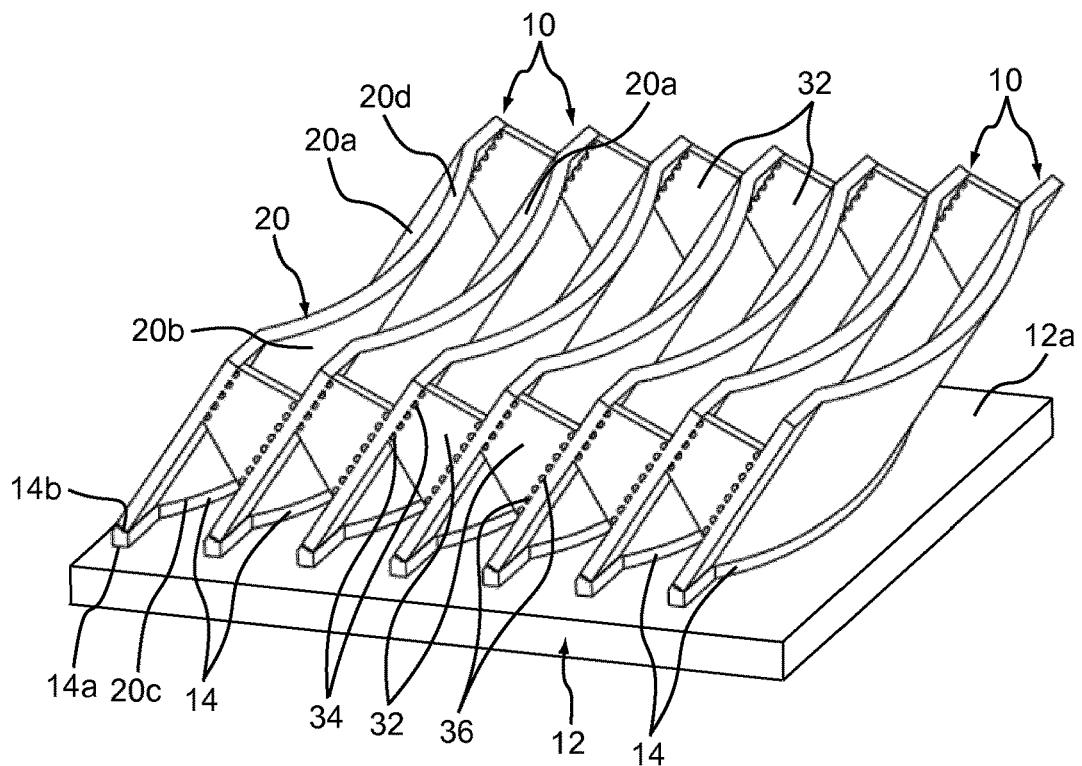
FIG. 6 is a schematic perspective view partially illustrating a method for manufacturing lining elements according to yet another exemplary embodiment.
Figure 7:
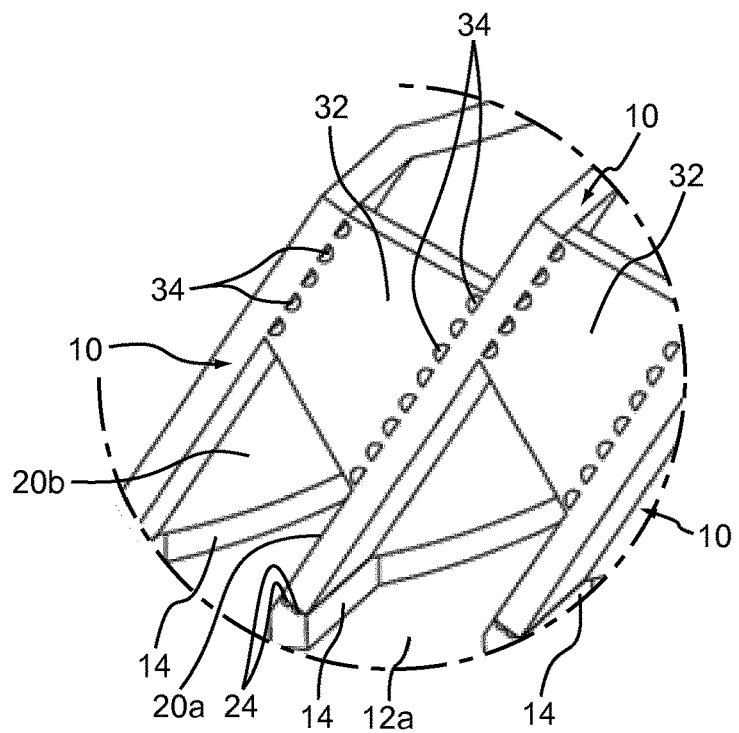
FIG. 7 is a view of a detail of FIG. 6.

In the exemplary embodiments described hereinabove, each lining element 10 is supported locally by the local supporting elements 16, 18 which are connected to the manufacturing support plate 12. In the exemplary embodiment illustrated in FIGS. 6 and 7, in which the elements that are identical bear the same references, each lining element 10 is associated with local supporting elements 32 each connected to the rear frontal face of the said element and the front frontal face 20a opposite belonging to the next lining element 10. There is no direct contact between the supporting elements 32 and the manufacturing support plate 12. This arrangement of the supporting elements 32 makes it possible to reduce still further the space there is between two successive lining elements 10 and therefore to increase the number of components that can be manufactured on the manufacturing support plate 12. In the exemplary embodiment illustrated, one supporting element 32 is provided at each end of the rear frontal face 20b of the associated lining element.

Cavities 34 are formed in the region of connection of the supporting element 32 to each associated lining element 10. For each supporting element 32, the cavities 34 are formed in a first connecting region formed by the part of the supporting element adjacent to the rear frontal face 20b of a lining element and in a second connecting region formed by the part of the said element adjacent to the front frontal face 20a of the next lining element.

In the exemplary embodiments illustrated, the lining elements formed on each manufacturing support plate are identical to one another. As an alternative, it is possible to provide protrusions that differ from one lining element to another according to the type of sipes to be moulded in the tread of the tire, or alternatively lining elements of different designs and/or having different heights on the one same manufacturing support plate.

In the exemplary embodiments illustrated, each lining element rests on a support which is produced in a single piece. Alternatively, it might be possible, without departing from the scope of the invention, to provide a support formed by a plurality of elements spaced apart from one another and each having a shape that is optimized for limiting the amount of powder used.

The invention has been described on the basis of the manufacture, by laser sintering, of a lining element for a mould for vulcanizing tires. The invention may also be applied to another lining element of the mould intended to be added to a support block of the mould, or more generally to other types of small-sized components used in different applications.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A method for additive manufacturing of a plurality of components on a manufacturing support plate by powder sintering or melting using at least one beam of energy, each component comprising at least two opposite front frontal and rear frontal faces delimiting the thickness of the component and a plurality of protrusions projecting out from the front frontal face thereof, the method comprising the following steps:
   a) simultaneous manufacturing, by depositing and selective melting of layers of powder stacked on the manufacturing support plate, of a plurality of intermediate assemblies at least in one row, each intermediate assembly comprising:
      (i) a component produced at an inclined angle with respect to the manufacturing support plate and forming an angle of between 20° and 70° with the support plate,
      (ii) a support interposed between the manufacturing support plate and a lower base of the said component, and
      (iii) at least one local supporting element resting against the rear frontal face of the component, the local supporting element of the assembly being arranged and configured in such a way as to avoid any contact with the protrusions of the component of the adjacent intermediate assembly of the row, and
      (iv) fused powder layers of the component, of the support and of the local supporting element being joined to one another,
   b) formation, during the selective-melting phases of the manufacturing step, of incipient cracks in regions of connection of the support and of the supporting element to the component of each intermediate assembly, and
   c) separation of the component from the support and the local supporting element of each intermediate assembly after the manufacturing step by breaking of the connecting regions.

2. The method according to claim 1, wherein at least one groove is formed locally on the rear frontal face of the component of each intermediate assembly and/or on the lower base of the component during the manufacturing step, the region of connection of the local supporting element to the component being positioned inside the groove.

3. The method according to claim 1, wherein the incipient cracks comprise a local reduction in the thickness of the connecting zones and/or local cavities formed on the zones.

4. The method according to claim 1, wherein a chamfered part is formed between the lower base of the component of each intermediate assembly and the rear frontal face thereof, the region of connection of the support to the component being connected to the chamfered part.

5. The method according to claim 1, wherein the region of connection of the support of each intermediate assembly to the component and/or the region of connection of the supporting element to the component have a density of less than 98%.

6. The method according to claim 1, wherein each intermediate assembly comprises at least two local supporting elements each one resting against one of the ends of the rear frontal face of the component.

7. The method according to claim 1, wherein the local supporting element of each intermediate assembly extends from the manufacturing support plate.

8. The method according to claim 1, wherein the local supporting element of each intermediate assembly is connected to the rear frontal face of the component of the assembly and to the front frontal face of the component of the adjacent intermediate assembly of the row, the faces facing one another.

9. The method according to claim 1, wherein the component of each intermediate assembly is a lining element for a tire mould having a thickness of between 0.25 and 6 millimetres.

* * * * *